United States Patent [19]

Garwin

[11] 4,101,375
[45] Jul. 18, 1978

[54] ISOTOPICALLY ENRICHED HELIUM-4

[76] Inventor: Leo Garwin, 326 Oklahoma Mortgage Bldg., Oklahoma City, Okla. 73102

[21] Appl. No.: 632,218

[22] Filed: Nov. 17, 1975

Related U.S. Application Data

[63] Continuation-in-part of Ser. No. 307,405, Nov. 17, 1972, abandoned.

[51] Int. Cl.² .................. F25J 3/08; C01B 23/00; G21C 15/28; C09K 5/00
[52] U.S. Cl. ........................................ 176/37; 62/22; 62/28; 62/40; 176/60; 252/71; 423/262
[58] Field of Search ................ 176/92 R, 60; 252/71; 423/262; 62/22, 28, 9, 14, 40

[56] References Cited

U.S. PATENT DOCUMENTS

| | | | |
|---|---|---|---|
| 2,915,446 | 12/1959 | Liljeblad | 176/92 R X |
| 3,063,926 | 11/1962 | Poole et al. | 176/92 R X |
| 3,126,267 | 3/1964 | Vander Arend | 62/27 |
| 3,251,542 | 5/1966 | Newgard et al. | 233/11 |
| 3,421,334 | 1/1969 | McKinney et al. | 62/28 |
| 3,609,984 | 10/1971 | Garwin | 62/22 |

OTHER PUBLICATIONS

"Apparatus and Method for Differential Distillation of Helium," Tully, U.S. Pat. Appl. 515,779, Oct. 17, 1974, Avail. NTIS.; C.A.84:96955y.
Fatouros et al., "Isotopically Pure He⁴," Cryogenics, Mar. 1975, pp. 147–148.
Mendelssohn, "Progress in Cryogenics", Heywood & Co., Ltd., vol. 1, London, 1959, p. 110.
Peshkov et al., "Experimental Work With 3He", Rep. Progs. Phys. 22 (1959), pp. 504–505.
Keller, "Helium 3 and Helium 4", Plenum Press, New York, 1969, p. 36.
Mezhov-Deglin, "An Apparatus for Producing Pure He⁴", Prib I Tekh Eksper, No. 3 (1971), p. 217, [Cryogenics, Aug. 1972, pp. 311–312].

Primary Examiner—Harris A. Pitlick
Attorney, Agent, or Firm—William R. Laney

[57] ABSTRACT

Isotopically enriched helium-4, that is to say, helium-4 which is low in helium-3, is useful as a nuclear reactor coolant. It is produced from liquefied natural gas source helium by removing helium-3 therefrom.

6 Claims, 4 Drawing Figures

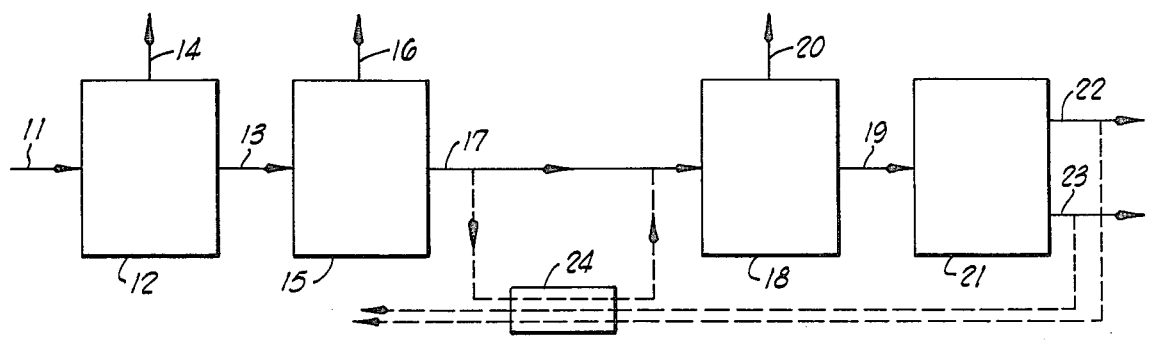
FIG. 1
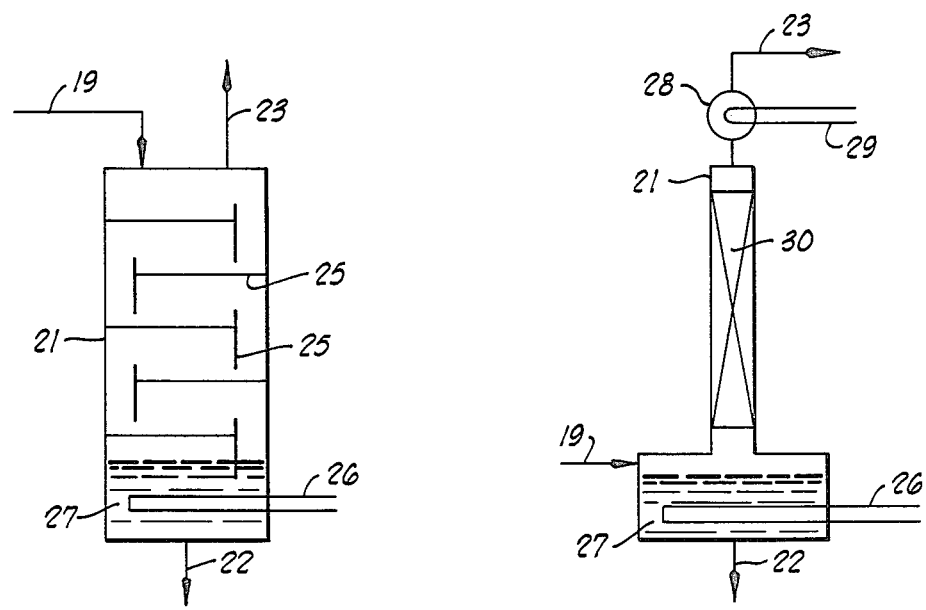
FIG. 2
FIG. 3
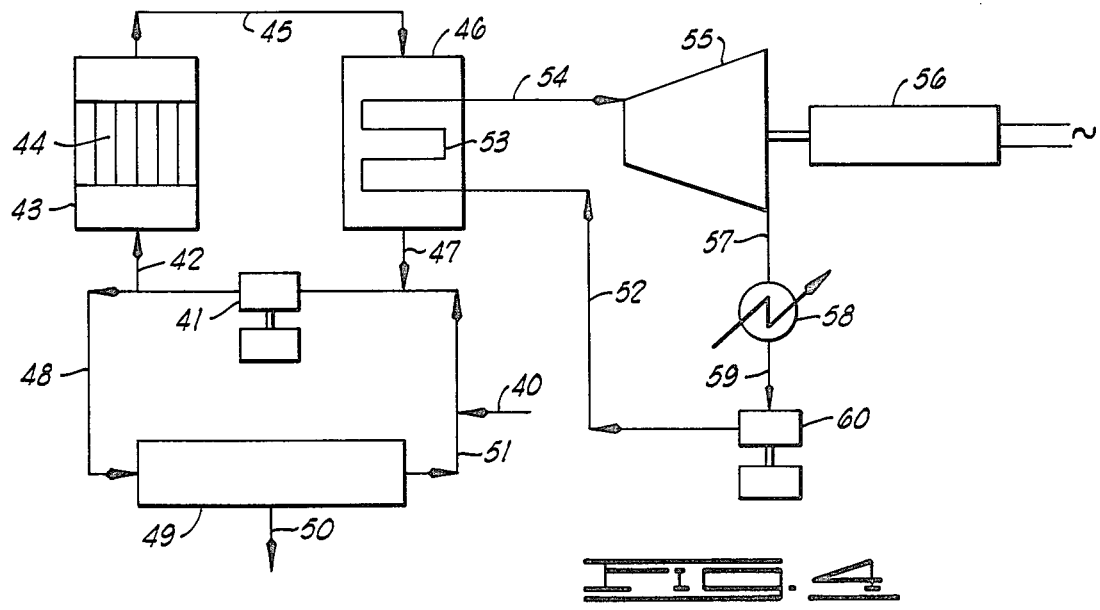
FIG. 4

ISOTOPICALLY ENRICHED HELIUM-4

RELATED APPLICATIONS

This application is a continuation-in-part of my copending application Ser. No. 307,405, filed Nov. 17, 1972, for "Isotopically Enriched Helium-4", now abandoned.

BACKGROUND OF THE INVENTION

1. Field of the Invention

This invention relates to isotopically enriched helium-4 (helium-4, the helium-3 content of which is below that in natural gas source helium), to a method of producing said isotopically enriched helium-4 from liquefied natural gas source helium, and to an improved process for cooling a nuclear reactor with helium through the use of isotopically enriched helium-4 as the coolant.

2. Brief Description of the Prior Art

There are two natural sources of helium which have been used for the production thereof, namely, natural gas and air, and there are two naturally occurring helium isotopes, helium-4 and helium-3. The predominant isotope, helium-4, possesses an atomic weight of 4 and comprises all but about one part per million (ppm), or less, on a volume or mole basis, of natural source helium. This isotopic form of helium becomes a superfluid liquid (possesses zero frictional resistance) at temperatures below around 2.2° K (obeys Bose-Einstein quantum statistics), and as a gas is impervious to radiation and possesses a low cross-section for neutron capture. Helium-3, the lighter isotope, has an atomic weight of 3, is present in natural source helium to the extent of about one ppm, or less, does not become superfluid at low temperatures (obeys Fermi-Dirac quantum statistics), and undergoes conversion in a strong radiation field through the absorption of beta particles to form tritium, the heaviest isotope of hydrogen, with a half-life of about 12-¼ years.

The isotopic ratio of helium-3 to helium-4 in natural source helium is about an order of magnitude higher in helium derived from the air (atmospheric source helium) than in helium derived from natural gas (natural gas source helium). On occasion, in the past, helium has been extracted for needed purposes from the atmosphere, but today the exclusive economic source of helium is natural gas. In atmospheric source helium the helium-3 content is fairly uniform at about 1.2 ppm. In natural gas source helium, the helium-3 content varies somewhat, ranging, according to some of the older measurements of Aldrich and Nier (Physical Review, Dec. 1, 1948, p. 1590), from about 0.05 to about 0.5 ppm, depending on the location of the natural gas. These results are imprecise, with an admitted relative error of about 10-30 percent.

More precise measurements of helium-3 in natural gas source helium have recently been made, using high resolution mass spectrometry. These show the helium-3 content of various samples of natural gas source helium to run between 0.17 and 0.23 ppm, with a precision in the measurement of about 0.01 ppm, essentially an order of magnitude better than that of the older measurements of Aldrich and Nier. It is therefore now well established that natural gas source helium contains generally not less than about 0.17 ppm of helium-3.

Up until very recently the helium-3 content of atmospheric source or natural gas source helium was of academic or theoretical interest only. However, in the last few years, with the advent of nuclear power, one of the major nuclear designs which has emerged is that of the high-temperature gas-cooled reactor (HTGR), developed in the United States by Gulf General Atomic, Inc. The HTGR design uses helium gas as the coolant, to abstract heat from the nuclear core, which heat is then converted first into mechanical and then into electrical energy. The HTGR design has recently imparted considerable practical significance to the matter of the helium-3 content of helium, as will hereinafter be discussed.

Currently there are two HTGR reactors operating in the United States. The earlier one is the Beach Bottom plant of Philadelphia Electric Company, a pilot unit of 40 Mw(e), and the more recent one is the 334 Mw(e) Fort St. Vrain reactor of Public Service Company of Colorado. Orders have recently been placed with Gulf General Atomic for a half-dozen or so additional plants in the capacity range 770-1160 Mw(e), with an estimated value in the neighborhood of $2-3 billion.

The HTGR possesses a helium coolant inventory averaging about 2.0 million standard cubic feet (MMscf) of helium per 1000 Mw(e). It varies somewhat, ranging from about 2.6 for the smaller reactor sizes in the 350 Mw(e) class to about 1.4 for the largest reactor size of 1150 Mw(e). The helium circulates at an operating pressure of 350-700 psig, at a rate of about one-fourth of its inventory per hour. There is withdrawn for purification some 10 percent of the helium inventory per hour, and there is made up for mechanical and other losses some 10 percent of the inventory per year.

The advantage of helium over other coolants reposes in its low density and high heat capacity, with attendant lower circulating rates and power requirements; its ability to operate without thermal decomposition at very high temperatures (so far, up to 2400° F), yielding high reactor thermal efficiencies; its chemical inertness (because it is a noble gas) toward any substance or component in the cirulating system with which it comes in contact; its stability, or imperviousness to radiation — it itself is a product, as an alpha particle, of radioactive disintegration; and its low cross-section for neutron capture, giving good reactor neutron efficiencies. Further, helium is readily purified to a high degree, so that the impurities normally present in it — nitrogen, neon, water, and hydrogen — are in the very low ppm range.

Now that some operating experience has been gained with the HTGR, it has been discovered that the helium-3 content of the helium circulant is a detrimental impurity, in that it undergoes nuclear modification in the high intensity radiation field of the reactor and is converted into radioactive tritium, which hence needs to be removed continuously, along with radioactive fission products which may escape from time to time from the core into the helium coolant. These other radioactive contaminants which may enter the helium coolant are heavy inert gases such as krypton and xenon, and are not too difficult to remove in a purification system. Tritium, a hydrogen isotope, on the other hand, is much lighter and is therefore not readily removed by physical absorption onto charcoal; it must be oxidized and the tritium oxide adsorbed, or it must be removed by reaction with porous titanium metal sponge, which sponge must physically be replaced when exhausted. The disposal of the tritium, in whatever form eliminated, presents a radioactive solid waste problem, because of the relatively high level of radioactivity and long half-life of tritium.

Upon recognition of the helium-3 problem in helium circulant, operators of the newer HTGR plants have attempted to fill and operate their systems with helium containing the lowest possible amount of helium-3. Since, however, the only helium which has been available for any purpose, including nuclear reactors, is ordinary commercial helium derived from natural gas (natural gas source helium) containing, as described earlier, approximately 0.20 ppm of helium-3, these operators, in their recent purchases of helium, have specified sources containing helium-3 in the lower 0.17-0.18 ppm range, even though it would be desirable and advantageous for them to use helium with a helium-3 level an order of magnitude below this, which low helium-3 content helium simply does not exist in nature.

It can thus be seen how advantageous it would be to produce and have as an HTGR coolant isotopically enriched helium-4, or helium which is significantly lower in helium-3 content than exists in natural gas source helium and preferably below about 0.05 ppm, the benefits in HTGR use being related directly to the degree of reduction of helium-3 content below its level in natural gas source helium.

I have discovered that isotopically enriched helium-4, non-existent in nature and an improved coolant for high-temperature gas-cooled reactors, can be produced from liquefied natural gas source helium by the removal therefrom of helium-3.

Separations of helium-3 and helium-4 are in themselves not new in the art, but as heretofore practiced do not produce the desired material of the instant invention, or do not operate on the natural gas source helium feedstock necessarily required for the instant invention, or do not operate under the coditions of separation of the present invention. The prior art separation methods fall into three categories.

1. The source material is a mixture of 1-3 mol percent helium-3 in helium-4, argon, air, and traces of tritium, derived from U.S. Energy Research and Development Administration (ERDA) operations via the production of tritium by neutron bombardment of lithium-6 isotope, the tritium subsequently decaying to helium-3, which source material is separated for the express purpose of producing therefrom a relatively high purity helium-3. The enrichment process is that of thermal diffusion (Chemical Engineering, Nov. 25, 1963, page 64), carried out at the Mound Laboratory of Monsanto Research Corporation of Miamisburg, Ohio, operating under contract with ERDA. The products are helium-3 of 99 percent purity and residue gas with a helium-3 content of the order of 0.01 percent or 100 ppm.

A recent improvement on this enrichment process is the substitution for thermal diffusion of low temperature distillation under vacuum (pressure 130 mm), as described by Wilkes (*Advances in Cryogenic Engineering*, Plenum Press, Vol. 16, (1970), page 298). The column overhead operating temperature was 1.93° K, the bottom temperature 2.80° K.

2. Helium-3 enrichment is achieved using natural source helium as the starting material. One method is that of cryogenic gas centrifugation (Newgard et al., U.S. Pat. No. 3,251,542). Another method depends on the superfluid properties of helium-4 below around 2.2° K to cause it to separate from helium-3 by passing through a superleak, the helium-3 being retained (Keller, Helium-3 and Helium-4, Plenum Press, page 36).

The helium-3 enrichment achieved per pass is of the order of 5 times, with consequent low yields of enriched helium-3 and insignificant helium-3 denuding of the remaining helium-4. Successive passes of the helium-3 enriched product are more difficult and less successful because the lambda point (the temperature at which superfluidity is achieved) decreases with increasing helium-3 content.

A combination of superleak filtration and vacuum distillation, in that order, is employed by McKinney et al. in U.S. Pat. No. 3,421,334. A dilute helium-3 in helium-4 feed stream (residue gas from the above-described thermal diffusion process — about 0.01 percent or 100 ppm of helium-3 in helium-4) is concentrated and purified to high purity helium-3 in a sequence of the two mentioned steps, in a common apparatus.

3. The feed material for the separation is about 6 mol percent helium-3 in helium-4. It is the heavier of two immiscible liquid phases in the helium-3, helium-4 dilution refrigerator, used to produce deep refrigeration, in the vicinity of 0.01° K. Essentially pure helium-3 is removed from the feed by evaporation or pumping at about 0.7° K under very high vacuum to regenerate the helium-3 refrigerant for recirculation.

Fairbank et al. (Physical Review, Vol. 71, pages 911-913, 1947) has reported coexistent vapor-liquid equilibrium data and relative volatilities for helium-3 and helium-4 in atmospheric source helium, at temperatures up to the normal boiling point of helium-4 (4.2° K). The relative volatility for this system, at helium-3 concentrations in the liquid in the neighborhood of 1 ppm, characteristic of atmospheric source helium, diminishes from something in excess of 5 near the lambda point to something below 2 in the vicinity of the normal boiling point of helium-4, and it would be expected, as recognized by Fairbank that this relative volatility would become unity at the critical temperature of helium-4, namely 5.2° K, at which point separation by distillation would become impossible. Fairbank did not employ natural gas source helium, with its significantly lower helium-3 concentrations than that of atmospheric source helium, and did not operate at superatmospheric pressure. It is well known that relative volatility in a non-ideal system, as this system is at these very low temperatures, is strongly dependent — in an unpredictable manner — on liquid concentration, and on system pressure.

Thus, so far as is known to me, none of the compositions described, produced, employed or encountered in the prior art is isotopically enriched helium-4, that is to say, helium with a helium-3 content significantly below the minimum 0.17 ppm level existing in natural gas source helium. Further, such separations of helium-3 from liquefied helium as have been made have occurred with a starting material no leaner in helium-3 than about 1 ppm, have produced enriched helium-3, and have been carried out generally under vacuum and at temperatures no higher than the normal boiling point of helium-4, under which prior art conditions the system is known to be characterized by high relative volatility and good separating power, although suffering from the economic disadvantages of high vacuum (low process throughput), high investment, and high operating (primarily refrigeration) costs.

Although higher operating pressures would generally be expected to be conducive to more economical vapor-liquid separations, this is not predictably so, particularly in the vicinity of the critical point of the system, because of an offsetting reduction in the relative volatility or separating power, for, as has been noted, at the critical temperature of the mixture the separating power disappears completely.

It was therefore surprising to find that the separation by distillation of helium-3 from liquefied natural gas source helium containing not more than about 0.23 ppm of helium-3 can indeed be effected, in temperature and pressure ranges beyond those previously attempted or employed, to yield isotopically enriched helium-4.

SUMMARY OF THE INVENTION

It is an object of this invention to provide a new composition, namely isotopically enriched helium-4, that is, helium-4 with a helium-3 content below that in any natural gas source helium.

It is a further object of this invention to provide a method of producing isotopically enriched helium-4 from liquefied natural gas source helium, by removing helium-3 therefrom.

It is a further object of this invention to provide an improved method of cooling HTGR nuclear reactors by the use therein as a coolant of isotopically enriched helium-4, the improvement resulting in lower purification requirements for the circulating helium.

Other objects, features and advantages of the invention will be apparent from the following detailed description of the invention, read in conjunction with the accompanying drawings.

DETAILED DESCRIPTION OF THE DRAWINGS

FIG. 1 is a schematic block flow diagram showing a method of producing isotopically enriched helium-4, starting with a natural gas helium source.

FIG. 2 is a more detailed diagrammatic representation of the helium-3 removal unit of FIG. 1, operated on a continuous basis.

FIG. 3 is another more detailed diagrammatic representation of the helium-3 removal unit of FIG. 1, operated on a batch basis.

FIG. 4 is a schematic block diagram showing a method of cooling a high-temperature gas-cooled nuclear reactor using isotopically enriched helium-4.

DESCRIPTION OF THE PREFERRED EMBODIMENTS

Referring to FIG. 1, a natural gas helium-containing source is fed via a line designated by general reference numeral 11 to helium extraction unit 12, wherein a portion of the helium content of the natural gas is removed as crude helium, which leaves via line 13. Helium-denuded gas leaves helium extraction unit 12 via line 14. The helium extraction unit can be any one of a number of designs, the preferred one being a low-temperature or cryogenic one, in which the non-helium components are preferentially liquefied by cooling and then separated. Another method of producing crude helium in helium extraction unit 12 is by gas permeation through membranes, in which the helium, being the lightest component, tends to preferentially diffuse through a semi-permeable gas membrane or barrier, whereby it is separated from the non-helium components of the gas.

Crude helium in line 13 contains helium predominantly, with lesser amounts of other gases, primarily nitrogen and neon, but also some hydrocarbons and hydrogen. It is passed to helium purification unit 15 in which, generally by a cryogenic process of liquefying and separating the remainder of the non-helium components and adsorbing the residual impurities onto charcoal, or molecular sieve, or both, operated at low temperature, the non-helium components and residual impurities are removed via line 16 to yield natural gas source helium, which leaves helium purification unit 15 via line 17. The impurities in natural gas source helium are reduced to such a level that subsequent liquefaction of said helium can readily take place, and comprise primarily nitrogen, but with some neon and occasionally trace amounts of hydrogen, water vapor and carbon dioxide.

Natural gas source helium is useful in the trade, possessing a range of purities from 99.995 vol. percent ("Grade A") through 99.997 percent ("High Purity") to about 99.999 percent ("Reactor Grade"), depending upon the application to which it is put. It can be made in any one of these purities by proper adjustment of the operating conditions in helium purification unit 15.

Natural gas source helium in line 17 ordinarily leaves helium purification unit 15 at a temperature near ambient and at a pressure of about 25–30 atm, but it can leave unit 15 at a low temperature, in the neighborhood of 80° K, to preserve the refrigeration imparted to it in unit 15 and needed in the subsequent liquefaction step.

Natural gas source helium in line 17 is passed to helium liquefaction unit 18 wherein the temperature of the helium is reduced to the neighborhood of 4°–5° K and the pressure reduced to about one atmosphere to produce liquefied natural gas source helium, which leaves via line 19. There is rejected in helium liquefaction unit 18 those trace quantities of impurities present in the natural gas source helium feed to unit 18; these impurities are removed in small low temperature adsorbers contained within unit 18, and leave via line 20. The purity of the liquefied natural gas source helium in line 19 is in excess of 99.999 vol. percent; it is generally 99.9999 percent, that is, it possesses an impurity level of only approximately 1 ppm, the impurities being limited to the non-helium components which are still soluble in the liquefied natural gas source helium at a temperature of 4°–5° K.

Liquefied natural gas source helium in line 19 is the stream from which isotopically enriched helium-4 is produced. It is passed to helium-3 removal unit 21 from which there leaves isotopically enriched helium-4 via line 22, generally as saturated liquid, and isotopically denuded helium-4 (helium-4, the helium-3 content of which is above its level in natural gas source helium) via line 23, generally as saturated vapor.

Since isotopically enriched helium-4 in line 22 and isotopically denuded helium-4 in line 23 each possesses a considerable amount of refrigeration relative to gaseous helium at ambient temperature, under which condition they would generally be used, this valuable refrigeration can be beneficially recovered to provide thereby a reduction in the cost of helium liquefaction in helium liquefaction unit 18 by heat exchanging in heat exchanger 24 these streams in lines 22 and 23 against the natural gas source helium stream in line 17 preparatory to its entering helium liquefaction unit 18, as shown by the dotted lines of FIG. 1.

Helium-3 removal unit 21 operates at a minimum temperature of about 4.2° K and a maximum temperature of about 5.1° K, just below the critical temperature of helium-4 of 5.2° K. The operating pressure corresponds to the saturation or equilibrium pressure of the system at operating temperature, and ranges accordingly between about 760 mm (1 atm) minimum and about 1700 mm (2.25 atm) maximum. Preferably, helium-3 removal unit 21 operates at a temperature between about 4.3° K and about 5.0° K, the corresponding superatmospheric saturation pressure being between about 800 mm (1.05 atm) and about 1500 mm (2.0 atm). The actual pressure (and temperature) condition selected for operation in the preferred range is based primarily on economics, a lower pressure (and temperature) providing greater separating power (fewer stages of separation) but requiring larger size equipment and higher operating costs, and a higher pressure characterized by more required stages of separation but providing simpler equipment configuration and generally lower operating costs.

FIG. 2 shows in greater detail one embodiment of helium-3 removal unit 21, in the form of a stripping column. The stripping column contains within it a plurality of contacting stages or trays, 25, which may be of any material suitable for low temperature operation, and in any form which provides intimate vapor-liquid contact. Feed comprising liquefied natural gas source helium enters the top of stripping column 21 via line 19. Liquid flows down the column from tray to try, to be met by an upwardly flowing countercurrent stream of vapor, generated by introducing a controlled amount of heat via heater 26 into liquid helium pool 27 at the bottom of the stripping column. The rising vapor preferentially removes from the downflowing liquid its helium-3 content, so that the liquid leaving the bottom of the stripping column via line 22 is isotopically enriched helium-4 and the vapor stream leaving the top of the column via line 23 is isotopically denuded helium-4.

FIG. 3 shows another embodiment of helium-3 removal unit 21, to produce isotopically enriched helium-4 from liquefied natural gas source helium, the process being conducted on a batch rather than on a continuous basis. Liquefied natural gas source helium is charged via line 19 to the bottom of helium-3 removal unit 21, which is in the form of a still, the still column containing packing 30 to provide extended vapor-liquid contacting surface. Vapor is generated out of the body of liquid 27 in the bottom of the still through the introduction of heat via heater 26. The vapor rises through column packing 30, passes to condenser 28, wherein a portion of the vapor is condensed to provide liquid reflux, which flows back down the column over the packing, the uncondensed vapor leaving via line 23. The condensing agent is any refrigerant, generally liquefied natural gas source helium at reduced pressure, which has a temperature below the condensing temperature of the vapor from the still, and which refrigerant enters the condenser via line 29. After a given amount of charge has been removed via line 23 as isotopically denuded helium-4, the remaining liquid in the still is withdrawn via line 22 as isotopically enriched helium-4.

The process of removing helium-3 from liquefied natural gas source helium to produce isotopically enriched helium-4 is further illustrated by the following examples.

EXAMPLE I

Natural gas containing 8 vol. percent helium, 90 percent nitrogen, 1 percent carbon dioxide and 1 percent argon is processed for helium extraction and purification to give natural gas source helium of 99.999 vol percent purity, the impurities being about 7 ppm of neon, 2 ppm of nitrogen and 1 ppm of water. This stream is heat exchanged and liquefied in a heat exchanger and a helium liquefaction unit, of the kind depicted by numerals 24 and 18, respectively, of FIG. 1. During liquefaction further purification of the helium takes place, and the liquefied natural gas source helium, of 99.9999 vol percent purity and containing 0.21 ppm of helium-3, is passed via line 19 at the rate of three gallons per minute to a helium-3 removal unit, in the form of a stripping column of the kind depicted by numeral 21 of FIG. 2. Stripping column 21 has a diameter of 6 inches and a height of 10 feet. It contains 20 stainless steel sieve trays on 6 inch spacing, each tray perforated with a multiplicity of ⅜ inch diameter holes to give 14 percent of the total column cross-section as open tray area. Each tray is equipped with a downcomer which has an effective open area of 20 percent of the column cross-section. The column is equipped at the bottom with a 750 watt electric heater, reference numeral 26. The column is operated under a variety of pressure-temperature conditions and with different heat inputs into heater 26, to generate different splits of feed into isotopically denuded helium-4 vapor exiting via line 23, and isotopically enriched helium-4 liquid exiting via line 22, the exiting streams having the compositions as shown below in Table 1.

TABLE 1

| Pressure | | | | Helium-3 Concentration | | |
|---|---|---|---|---|---|---|
| | | | Fraction | Isotopically Enriched | Isotopically Denuded | Heat |
| mm Hg | atm | Temperature | Stripped | Helium-4 | Helium-4 | Input |
| 760 | 1.00 | 4.2° K | 0.90 | <0.01 ppm | 0.23 ppm | 550 watts |
| 950 | 1.25 | 4.5 | 0.70 | 0.04 | 0.28 | 425 |
| 1400 | 1.84 | 5.0 | 0.80 | 0.06 | 0.25 | 475 |

EXAMPLE II

One thousand three hundred fifty (1,350) standard cc. of natural gas source helium containing 0.21 ppm of helium-3 is liquefied to produce approximately 50 liters of liquid helium, which is then charged to a batch still, of the kind shown by reference numeral 21 of FIG. 3. The still column is of stainless steel, 1 inch in internal diameter and packed with a 30 inch height of stainless steel helices. The still is equipped with an overhead helium condenser, using liquefied natural gas source helium at reduced pressure to provide a refrigerant temperature below that of the condensing vapor in the column.

The still is equipped at the bottom with a 5 watt heater. It is operated at full heater input at a pressure slightly above atmospheric, with control of the pressure through regulation of the amount of refrigerant permitted into the condenser, and with a constant volume of 60 standard cubic feet of overhead product withdrawn per hour, thus operating at a constant reflux ratio of about 1.8.

The distillation is continued until the amount of liquid remaining in the bottom of the still is 60.5 percent of the original, at which time the concentration of helium-3 found therein is 0.13 ppm. The composite gas withdrawn overhead from the beginning has a helium-3 concentration of 0.34 ppm.

The distillation is further continued under the same conditions until the liquid in the bottom of the still has been reduced to 45.2 percent of the original amount. It is found that the helium-3 content of the liquid residue is 0.09 ppm, and that the composite gas withdrawn overhead from the beginning of the distillation has 0.30 ppm of helium-3.

The distillation is still further continued under the same conditions until the liquid in the bottom of the still has been reduced to 30.2 percent of the original amount. It is found that the helium-3 content of the liquid residue is 0.06 ppm, and that the composite gas withdrawn overhead from the beginning of the distillation to the end has a helium-3 content of 0.27 ppm.

Referring now to FIG. 4, helium coolant gas is introduced into the high-temperature gas-cooled nuclear reactor coolant system through line 40, to fill the system and to make up subsequent operations losses. During operation, helium circulant at a temperature of about 760° F and a pressure of 700 psig is picked up by helium circulator 41 and delivered via line 42 into nuclear reactor 43 containing core 44. Upon passing through core 44, the circulant picks up nuclear heat and leaves reactor 43 through line 45 at a temperature of 1430° F. It is routed to steam generator 46 wherein it is cooled from 1430° F back to 760° F and from which it leaves via line 47. A portion of the circulating helium stream is withdrawn from the discharge side of helium circulator 41 via line 48 to enter purification system 49 wherein impurities, including radioactive ones such as tritium, from helium-3 and otherwise, are removed via line 50. Purified helium leaves purification system 49 via line 51 to re-enter the main circulating loop at the suction side of circulator 41. Feedwater enters steam generator 46 via line 52, is heated, vaporized and superheated in steam coil 53 and leaves generator 46 via line 54 at a temperature of 1000° F and a pressure of 2400 psig. The steam enters turbine 55 in which it carries out work, driving generator 56. Exhaust steam leaving turbine 55 via line 57 is condensed in condenser 58 to water. Condensate leaves condenser 58 via line 59 to enter feedwater pump 60, by which it is discharged into line 52 to repeat the cycle.

When natural gas source helium is the coolant, the volume of tritium and hydrogen formed and removed per year in the purification system is about 0.5 percent of the helium inventory volume. The tritium volume is only on the order of 0.01 percent of this, but the tritium is strongly radioactive; ordinary hydrogen is not. Upon substitution of isotopically enriched helium-4 containing 0.05 ppm of helium-3 as the coolant, the volume of tritium and hydrogen formed and removed in the purification system is hardly changed, but the radioactivity level of the products so removed is reduced by more than 50 percent, and the frequency with which the impurity removal beds need to be disposed of is sharply diminished.

The foregoing detailed description and the drawings are for the purposes of illustration only, and are not intended as being limiting to the spirit or scope of the appended claims.

I claim:

1. A method of producing isotopically enriched helium-4 which comprises removing by distillation helium-3 from liquefied natural gas source helium, said removal being accomplished at a temperature between about 4.2° K and about 5.1° K, and at a pressure equal to the equilibrium pressure of the system.

2. The method of claim 1, wherein the removal of helium-3 is accomplished at a temperature between about 4.3° K and about 5.0° K, and at a pressure equal to the equilibrium pressure of the system.

3. A method for more safely and efficiently cooling a high-temperature, gas-cooled nuclear reactor comprising:

liquefying natural gas source helium;

subjecting the liquefied natural gas source helium to distillation carried out at a temperature of between about 4.2° K and about 5.1° K, and at a pressure equal to the equilibrium pressure of the system, to separate, by such distillation, and through the removal of the helium-3 isotope in the course of the distillation, the liquefied natural gas source helium into an isotopically enriched helium-4 fraction containing less than about 0.17 ppm of helium-3, and an isotopically denuded helium-4 fraction; and circulating at least a portion of the isotopically enriched helium-4 fraction through the high-temperature, gas-cooled nuclear reactor to provide at least a portion of the coolant gas therefor.

4. The process defined in claim 3 wherein the separation is carried out at a temperature between about 4.3° K and about 5.0° K and the helium-3 content of the separated isotopically enriched helium-4 fraction is below about 0.06 ppm.

5. A method for more safely and efficiently cooling a high-temperature, gas-cooled nuclear reactor comprising:

subjecting liquefied natural gas source helium to distillation carried out at a temperature of from about 4.2° to a temperature less than the critical temperature of the liquefied natural gas source helium, and at a pressure equal to the equilibrium pressure of the system, to separate, by such distillation, and through the removal of the helium-3 isotope in the course of the distillation, the liquefied natural gas source helium into an isotopically enriched helium-4 fraction containing less than about 0.17 ppm of helium-3 and an isotopically denuded helium-4 fraction; and circulating at least a portion of the isotopically enriched helium-4 fraction through the high-temperature gas-cooled nuclear reactor to provide at least a portion of the coolant gas therefor.

6. The process defined in claim 5 wherein the separation is carried out at a temperature of between about 4.3° K and about 5.0° K, and the helium-3 content of the separated isotopically enriched helium-4 fraction is below about 0.06 ppm.

* * * * *